United States Patent
Yang et al.

(10) Patent No.: US 12,398,312 B2
(45) Date of Patent: Aug. 26, 2025

(54) ADDITIVE TO REDUCE POLYMER SOLIDS DEPOSITION AT PUMP HEAD

(71) Applicant: Baker Hughes Oilfield Operations LLC, Houston, TX (US)

(72) Inventors: Jianzhong Yang, Missouri City, TX (US); William Woode, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/403,472

(22) Filed: Jan. 3, 2024

(65) Prior Publication Data

US 2025/0215307 A1 Jul. 3, 2025

(51) Int. Cl.
*C09K 8/588* (2006.01)
*C09K 8/035* (2006.01)

(52) U.S. Cl.
CPC .............. *C09K 8/588* (2013.01); *C09K 8/035* (2013.01); *C09K 2208/28* (2013.01)

(58) Field of Classification Search
None
See application file for complete search history.

(56) References Cited

U.S. PATENT DOCUMENTS

| | | |
|---|---|---|
| 6,203,585 B1 | 3/2001 | Majerczak |
| 7,776,958 B2 | 8/2010 | Strominger et al. |
| 9,505,971 B2 | 11/2016 | Kumar et al. |
| 9,644,161 B2 | 5/2017 | Kommareddi et al. |
| 10,578,252 B2 | 3/2020 | Olechnowicz et al. |
| 11,098,221 B2 | 8/2021 | Johnston et al. |
| 2006/0148928 A1* | 7/2006 | Harris ............ F17D 1/17 523/175 |
| 2007/0207933 A1* | 9/2007 | McMechan ........ C09K 8/882 507/224 |
| 2015/0175878 A1* | 6/2015 | Kelly ............ C09K 8/92 166/177.5 |
| 2016/0281934 A1 | 9/2016 | Olechnowicz et al. |
| 2017/0015846 A1 | 1/2017 | Bene et al. |
| 2017/0096597 A1* | 4/2017 | Hu ............ C09K 8/602 |
| 2017/0130154 A1 | 5/2017 | Kommareddi et al. |
| 2018/0118893 A1 | 5/2018 | Burden et al. |
| 2021/0198555 A1* | 7/2021 | Asirvatham ........ C09K 8/584 |

FOREIGN PATENT DOCUMENTS

| | | |
|---|---|---|
| CN | 112593449 A | 4/2021 |
| CN | 1133583176 A | 8/2021 |
| GB | 2331761 A | 6/1999 |

OTHER PUBLICATIONS

International Search Report and Written Opinion dated Mar. 27, 2025 for PCT/US2025/010314.

* cited by examiner

*Primary Examiner* — Andrew Sue-Ako
(74) *Attorney, Agent, or Firm* — Crowe & Dunlevy, P.C.

(57) ABSTRACT

A drag-reducing formulation includes a polymer composition and a biodegradable fatty acid ester. In certain embodiments, the polymer composition includes at least one latex polymer. The biodegradable fatty acid ester has a structure of $R_1C(=O)OR_2$, where $R_1$ is a $C_8$-$C_{40}$ alkyl or alkenyl group having between zero to three C=C double bonds and $R_2$ is a $C_1$-$C_{15}$ alkyl or alkenyl group. In another aspect, a method of using a drag-reducing formulation involves the steps of deriving a biodegradable fatty acid from a renewable source and mixing the biodegradable fatty acid ester with a polymer composition having at least one latex polymer to obtain the drag-reducing formulation. The method further involves introducing the drag-reducing formulation at an injection point.

20 Claims, No Drawings

ADDITIVE TO REDUCE POLYMER SOLIDS DEPOSITION AT PUMP HEAD

FIELD OF THE INVENTION

The present application is generally directed at drag-reducing agents and methods for using such drag-reducing agents.

BACKGROUND

Certain chemistries have been developed to reduce the effect of friction ("drag") experienced by a liquid hydrocarbon, such as crude oil, flowing through a hydrocarbon transportation pipeline. Reduction of drag is desirable because it decreases the amount of energy needed to accomplish flow and, therefore, also decreases the costs associated with pumping. Drag reducing agents can take various forms, including polymers in the form of latexes, oil soluble suspensions, emulsions, pellets, gels, microfine powders, and particulate slurries.

Although these chemistries can be useful for reducing drag, certain drag reducing agents experience severe particle agglomeration during pumping operations. Drag reducing agents that are susceptible to particle agglomeration include formulations having latex polymer in an emulsion and formulations with solid polymer dispersed in solvent as a dispersion slurry. The agglomerated particles of these drag reducing agents tend to be very hard, and the resulting solids may plug check valves in injection pump equipment, create build-up at the pump head, or otherwise cause injection failure and flow assurance problems. While "flow assurance" and "assured flow" are terms used in the oil and gas industry to mean ensuring successful and economical flow of a hydrocarbon stream from a subterranean reservoir to the point of sale, these terms as used herein are defined to mean ensuring successful flow of a drag reducing agent, whether the drag reducing agent is neat or is in a drag reducing formulation or is within a hydrocarbon stream.

Addressing the agglomeration of drag reducing agent particles typically requires manual intervention that disrupts the injection schedule. To avoid these disruptions, chemical additives to drag reducing agents have been proposed to mitigate solids build-up. While these chemical additives have demonstrated some success in reducing injection failure and flow assurance issues, they have failed to fully control the problem of latex particle agglomeration.

Further, the increased emphasis on addressing environmental concerns is motivating the oil and gas industry to seek chemistries that are more environmentally friendly. To reduce both carbon footprint and cost, it is desirable to derive these chemical treatments from renewable sources. It is further desirable to have additives that are biodegradable in the environment.

There is, therefore, a need for effective and environmentally friendly treatments for use in addressing particle agglomeration for drag reducing agent. Further, there is a need for chemical treatments to mitigate the agglomeration of latex particles with latex-based drag reducing agents. The present disclosure is directed at these and other deficiencies in the prior art.

SUMMARY OF THE INVENTION

The inventive concepts disclosed are generally directed to a drag-reducing formulation that includes a polymer composition and a biodegradable fatty acid ester derived from a vegetable-based oil. The polymer composition includes a latex polymer. The biodegradable fatty acid ester is derived from a vegetable-based oil and has a structure of $R_1C(\!\!=\!\!O)OR_2$, where $R_1$ is a $C_8$-$C_{40}$ alkyl or alkenyl group having between zero to three C=C double bonds, and where $R_2$ is a $C_1$-$C_{15}$ alkyl or alkenyl group. Further, the biodegradable fatty acid ester can form a surface coat for the latex polymer and reduce solid build up associated with the polymer composition.

In another aspect, a drag-reducing formulation includes a polymer composition, at least one plasticizer, and a biodegradable fatty acid ester. The biodegradable fatty acid ester has a structure of $R_1C(\!\!=\!\!O)OR_2$, where $R_1$ is a $C_8$-$C_{40}$ alkyl or alkenyl group having between zero to three C=C double bonds, and where $R_2$ is a $C_1$-$C_{15}$ alkyl or alkenyl group.

In yet another aspect, a method is disclosed for using a drag-reducing formulation. The method includes deriving a biodegradable fatty acid ester with a structure of $R_1C(\!\!=\!\!O)OR_2$ from a renewable source and mixing the biodegradable fatty acid ester with a polymer composition to obtain the drag-reducing formulation. $R_1$ of the biodegradable fatty acid ester is a $C_8$-$C_{40}$ alkyl or alkenyl group having between zero to three C=C double bonds, and $R_2$ is a $C_1$-$C_{15}$ alkyl or alkenyl group. The polymer composition includes at least one latex polymer. The method further includes the step of introducing the drag-reducing formulation at an injection point.

DETAILED DESCRIPTION

It has been discovered that certain fatty acid derivatives can function as a surface coat for solid polymer particles, thereby protecting them during use as a drag reducing agent. This surface coating may, for example, stabilize the latex emulsion of a latex-based drag reducing agent to prevent the emulsion from breaking during injection, or may protect the dispersion of solid polymers dispersed in solvent as a dispersion slurry. In addition to protecting the integrity of the drag reducing agent, the fatty acid derivatives function as a lubricity additive to reduce flow resistance at the pump head of injection pump equipment by imparting flexibility to the polymer particles of the drag reducing agent. These derivatives may, therefore, be used to significantly reduce the agglomeration of particles in drag reducing agent formulations that would otherwise regularly produce solids at a pump head. In some instances, no perceptible solids build-up was observed after the addition of these fatty acid derivatives to a latex drag reducing agent.

In addition to effectively mitigating the problem of particle agglomeration for drag reducing agents, these fatty acid derivatives are completely biodegradable and are derived from a renewable source, thereby creating little carbon footprint.

According to various embodiments disclosed herein, a drag-reducing formulation includes a polymer composition and a biodegradable fatty acid ester.

The polymer composition component of the drag-reducing formulation includes at least one polymer in the form of a latex, an oil soluble suspension, an emulsion, a pellet, a gel, a microfine powder, or a particulate slurry. In one non-limiting embodiment, the polymer composition includes at least one latex polymer derived from the polymerization of at least one acrylate monomer, at least one methacrylate monomer, or a combination of at least one acrylate monomer with at least one methacrylate monomer. In various non-limiting embodiments, suitable monomers for the latex polymer include 2-ethylhexyl methacrylate, isobutyl methacrylate, butyl methacrylate, 2-ethylhexyl acrylate, isobutyl acrylate, butyl acrylate, $C_1$-$C_6$ alcohol esters (i.e., alcohol esters having between 1 to 6 carbon atoms) of acrylic acid or methacrylic acid, styrene, and acrylic acid.

The biodegradable fatty acid ester has a structure of $R_1C(=O)$ $OR_2$, where $R_1$ is a $C_8$-$C_{40}$ alkyl or alkenyl group having between zero to three C=C double bonds and $R_2$ is a $C_1$-$C_{15}$ alkyl or alkenyl group. In one embodiment, the biodegradable fatty acid ester is a mono alkyl ester, i.e., a fatty acid methyl ester. In another embodiment, the biodegradable fatty acid ester is a fatty acid ethyl hexyl ester (FAEHE), e.g., fatty acid 2-ethylhexyl ester. The biodegradable fatty acid ester is derived from a renewable source. In various non-limiting embodiments, suitable renewable sources for the biodegradable fatty acid ester include vegetable-based oil, castor oil, soy lecithin, or a biodiesel production source.

The drag-reducing formulation includes between about 10 wt. % and about 50 wt. % polymer composition and between about 1 wt. % and about 20 wt. % biodegradable fatty acid ester. In certain embodiments, the drag-reducing formulation includes about 15 wt. % to about 45 wt. % polymer composition and between about 2 wt. % and about 15 wt. % biodegradable fatty acid ester. In yet other embodiments, the drag-reducing formulation includes about 30 wt. % polymer composition and about 10 wt. % biodegradable fatty acid ester.

It will be understood that, as used herein, a range of X wt. % to Y wt. % will be interpreted to include the disclosure of each discrete integer value between X and Y (e.g., X, X+1, X+2 . . . . Y–1, Y).

In some instances, the drag-reducing formulation also includes at least one plasticizer. Suitable plasticizers include, but are not necessarily limited to, glycols, polyglycols, glycol ethers, esters, aliphatic alcohols (e.g., 2-ethylhexyl alcohol, isoheptanol, isohexanol, isodecanol, 1-hexanol, 1-octanol, nonanol), paraffinic and isoparaffinic solvents, white and mineral spirit blends, aromatic alcohols, ketones, aldehydes, aromatic solvents (e.g., toluene, xylene and mixtures thereof), and combinations thereof. In one embodiment, the plasticizer is 2-ethylhexanol.

In one embodiment, the at least one plasticizer is present in an amount effective to improve the ability to pump the latex polymer into a liquid hydrocarbon, e.g., with assured flow. The weight ratio of the at least one plasticizer to the latex polymer may range from about 1/99 independently to about 30/70; alternatively, from about 5/95 independently to about 20/80; and in a different non-limiting embodiment from about 7/93 independently to about 10/90. The use of the term "independently" herein with respect to a range means that any lower threshold may be combined with any upper threshold to provide a suitable alternative range.

The plasticizer may be added after the latex particles are already formed, or alternatively, may be added to the monomer prior to polymerization. In other words, in this latter embodiment, it is possible to get the same plasticizing effect by diluting the monomer with a solvent on the front end of the process of making the at least one latex polymer. A solvent would need to be selected that is substantially insoluble in water and is a solvent for both the monomer and the at least one latex polymer being produced. Essentially, instead of conducting the reaction where the dispersed phase is 100 wt. % monomer, a mixture of monomer and plasticizer/solvent would be used, in a non-limiting example, 80 wt. % monomer and 20 wt. % plasticizer/solvent. Suitable solvents may include, but are not necessarily limited to, kerosene, toluene, xylene, $C_6$-$C_{16}$ alkanes or cycloalkanes, toluene, mineral oil solvents, and the like and combinations thereof. In another non-limiting embodiment, the lower threshold of the weight ratio of at least one plasticizer to monomer ranges from about 1/99 independently to about 20/80; alternatively, from about 10/90 independently to about 5/95. Upon completion of the polymerization reaction, the monomer might fully (100%) convert to polymer, but the plasticizer/solvent will restrict the % polymer in each latex particle to, e.g., 80 wt. % (the monomer percentage in the original mixture).

In another aspect, a method of using a drag-reducing formulation involves the steps of deriving a biodegradable fatty acid ester from a renewable source and mixing the biodegradable fatty acid ester with a polymer composition to obtain the drag-reducing formulation. The addition of the biodegradable fatty acid ester to the polymer composition results in assured flow for the drag-reducing formulation when it is subsequently introduced at an injection point. The introduction of the drag-reducing formulation at the injection point may involve injecting the drag-reducing formulation into a pipeline. In various non-limiting embodiments, the step of introducing the drag-reducing formulation includes a step of injecting the drag-reducing formulation into a liquid hydrocarbon. Suitable liquid hydrocarbons include crude oil, heavy oil, gasoline, diesel fuel, fuel oil, naphtha, asphalt, and mixtures thereof. "Crude oil" is defined herein to include heavy crude oil.

EXAMPLE I

Several additives were formulated with a latex polymer drag reducing agent and screened for reduction in solids build-up of the latex polymer particles. For these tests, the latex polymer with additives was circulated through a small chemical pump for 3 hours, and solids were collected and weighted at the end of the circulation. These formulations were compared against a control sample of the latex polymer drag reducing agent neat. The presence of solids and percentage of solid reduction were observed for each of the treated samples, with the following results:

TABLE 1

| Drag-Reducing Formulation Samples | wt. % | Final Solid wt. (g) | % Solid Reduction |
|---|---|---|---|
| Control | — | 0.4 | N/A |
| Corn oil fatty triglyceride | 5 | 0.7 | −75 |
| Castor oil (40% emulsion in water) | 5 | 0.15 | 62.5 |
| Fatty acid methyl ester (FAME) | 5 | 0.005 | 98.75 |
| Fatty acid methyl ester (FAME) | 10 | 0.00 | 100 |
| Fatty acid 2-ethylhexyl ester (FAEHE) | 5 | 0.005 | 98.75 |

As shown in Table 1, the addition of corn oil fatty triglyceride increased the amount of solids build-up for the latex-based drag reducing agent. By contrast, the castor oil reduced latex polymer agglomeration by slightly more than 60%. The best performer was one of the fatty acid methyl ester samples (at 10 wt. %), which resulted in complete solids reduction. The other fatty acid methyl ester sample (at 5 wt. %) and the fatty acid 2-ethylhexyl ester sample achieved nearly complete solids reduction (approximately 99%), with only 0.005 grams of solid resulting from the latex polymers.

In the foregoing specification, the invention has been described with reference to specific embodiments thereof.

However, it will be evident that various modifications and changes can be made thereto without departing from the broader scope of the invention as set forth in the appended claims. Accordingly, the specification is to be regarded in an illustrative rather than a restrictive sense. For example, drag reducing agents, polymers, latex compositions, monomers, fatty acid esters, treatment procedures, proportions, dosages, temperatures, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter, i.e., +5% of the stated value). As used herein, the term "and/or" includes any and all combinations of one or more of the associated listed items. As used herein, the term "elevated temperatures" refers to a temperature range above about 35° C.

It is claimed:

1. A drag-reducing formulation comprising:
    a polymer composition comprising a latex polymer; and
    a biodegradable fatty acid ester derived from a vegetable-based oil,
        wherein the biodegradable fatty acid ester has a structure of $R_1C(=O)$ $OR_2$, where $R_1$ is a $C_8$-$C_{40}$ alkyl or alkenyl group comprising between zero to three C=C double bonds, where $R_2$ is a $C_1$-$C_{15}$ alkyl or alkenyl group; and
        wherein the biodegradable fatty acid ester forms a surface coat on the latex polymer and reduces solid build-up associated with the polymer composition by more than 62.5%.

2. The drag-reducing formulation of claim 1, wherein the latex polymer is derived from at least one monomer selected from the group consisting of acrylates, methacrylates, and combinations thereof.

3. The drag-reducing formulation of claim 2, wherein the at least one monomer is selected from the group consisting of 2-ethylhexyl methacrylate, isobutyl methacrylate, butyl methacrylate, 2-ethylhexyl acrylate, isobutyl acrylate, butyl acrylate, $C_1$-$C_6$ alcohol esters of acrylic acid or methacrylic acid, styrene, acrylic acid, and combinations thereof.

4. The drag-reducing formulation of claim 1, wherein the biodegradable fatty acid ester is a fatty acid methyl ester (FAME) or a fatty acid ethyl hexyl ester (FAEHE).

5. The drag-reducing formulation of claim 1 further comprising at least one plasticizer selected from the group consisting of glycols, polyglycols, glycol ethers, esters, aliphatic alcohols, aromatic alcohols, ketones, aldehydes, paraffinic and isoparaffinic solvents, white and mineral spirit blends, aromatic solvents, and combinations thereof.

6. The drag-reducing formulation of claim 5, wherein the at least one plasticizer is 2-ethylhexanol.

7. A drag-reducing formulation comprising:
    a polymer composition comprising a latex polymer;
    at least one plasticizer; and
    a biodegradable fatty acid ester having a structure of $R_1C(=O)$ $OR_2$, where $R_1$ is a $C_8$-$C_{40}$ alkyl or alkenyl group comprising between zero to three C=C double bonds, where $R_2$ is a $C_1$-$C_{15}$ alkyl or alkenyl group,
    wherein the biodegradable fatty acid ester forms a surface coat on the latex polymer and reduces solid build-up associated with the polymer composition by more than 62.5%.

8. The drag-reducing formulation of claim 7, wherein the latex polymer is derived from at least one monomer selected from the group consisting of acrylates, methacrylates, and combinations thereof.

9. The drag-reducing formulation of claim 8, wherein the at least one monomer is selected from the group consisting of 2-ethylhexyl methacrylate, isobutyl methacrylate, butyl methacrylate, 2-ethylhexyl acrylate, isobutyl acrylate, butyl acrylate, $C_1$-$C_6$ alcohol esters of acrylic acid or methacrylic acid, styrene, acrylic acid, and combinations thereof.

10. The drag-reducing formulation of claim 7, wherein the at least one plasticizer is selected from the group consisting of glycols, polyglycols, glycol ethers, esters, aliphatic alcohols, aromatic alcohols, ketones, aldehydes, paraffinic and isoparaffinic solvents, white and mineral spirit blends, aromatic solvents, and combinations thereof.

11. The drag-reducing formulation of claim 10, wherein the at least one plasticizer is 2-ethylhexanol.

12. The drag-reducing formulation of claim 7, wherein the biodegradable fatty acid ester is derived from vegetable-based oil, castor oil, soy lecithin, or a biodiesel production source.

13. The drag-reducing formulation of claim 7, wherein the biodegradable fatty acid ester is a fatty acid methyl ester (FAME) or a fatty acid ethyl hexyl ester (FAEHE).

14. The drag-reducing formulation of claim 7 comprising:
    between about 10 wt. % to about 50 wt. % polymer composition; and
    between about 1 wt. % to about 20 wt. % biodegradable fatty acid ester.

15. The drag-reducing formulation of claim 7, wherein the at least one plasticizer is present in an amount effective to improve the ability to pump the latex polymer into a liquid hydrocarbon.

16. The drag-reducing formulation of claim 7, wherein the weight ratio of the at least one plasticizer to latex polymer ranges from about 1/99 to about 10/90.

17. A method of using a drag-reducing formulation comprising the steps of:
    deriving a biodegradable fatty acid ester with a structure of $R_1C(=O)$ $OR_2$ from a renewable source, where $R_1$ is selected from a $C_8$-$C_{40}$ alkyl or alkenyl group comprising between zero to three C=C double bonds, where $R_2$ is a $C_1$-$C_{15}$ alkyl or alkenyl group;
    mixing the biodegradable fatty acid ester with a polymer composition comprising at least one latex polymer to obtain the drag-reducing formulation;
    introducing the drag-reducing formulation at an injection point; and
    wherein the biodegradable fatty acid ester forms a surface coat on the at least one latex polymer to reduce solid build-up associated with the polymer composition by more than 62.5%.

18. The method of claim 17, wherein the step of deriving the biodegradable fatty acid from the renewable source further comprises the step of deriving the biodegradable fatty acid from vegetable-based oil, castor oil, soy lecithin, or a biodiesel production source.

19. The method of claim 17, wherein the step of introducing the drag-reducing formulation at the injection point further comprises injecting the drag-reducing formulation into a pipeline.

20. The method of claim 17, wherein the step of introducing the drag-reducing formulation at the injection point further comprises injecting the drag-reducing formulation into a liquid hydrocarbon selected from the group consisting of crude oil, heavy oil, gasoline, diesel fuel, fuel oil, naphtha, asphalt, and mixtures thereof.

* * * * *